(12) United States Patent
O'Neill

(10) Patent No.: US 8,521,517 B2
(45) Date of Patent: *Aug. 27, 2013

(54) PROVIDING DEFINITIONS THAT ARE SENSITIVE TO THE CONTEXT OF A TEXT

(75) Inventor: Thomas G. O'Neill, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/249,410

(22) Filed: Sep. 30, 2011

(65) Prior Publication Data

US 2012/0150533 A1 Jun. 14, 2012

Related U.S. Application Data

(63) Continuation of application No. 13/076,685, filed on Mar. 31, 2011.

(60) Provisional application No. 61/422,424, filed on Dec. 13, 2010.

(51) Int. Cl.
*G06F 17/21* (2006.01)

(52) U.S. Cl.
USPC ...... 704/10; 704/1; 704/9; 707/706; 707/707; 707/708; 715/259

(58) Field of Classification Search
USPC ............ 704/1, 9, 10; 707/706–708; 715/259
See application file for complete search history.

(56) References Cited

U.S. PATENT DOCUMENTS

| | | | |
|---|---|---|---|
| 6,532,442 B1 | 3/2003 | Schumacher et al. | |
| 6,961,722 B1 | 11/2005 | Bruecken | |
| 7,305,415 B2 * | 12/2007 | Vernau et al. | 1/1 |
| 7,725,481 B2 * | 5/2010 | Bruecken | 707/758 |
| 7,869,989 B1 * | 1/2011 | Harvey et al. | 704/9 |
| 8,027,989 B1 * | 9/2011 | Bruecken | 707/758 |
| 2004/0068527 A1 * | 4/2004 | Smith, III | 707/204 |
| 2004/0138872 A1 | 7/2004 | Nir | |
| 2005/0080613 A1 * | 4/2005 | Colledge et al. | 704/9 |
| 2005/0132281 A1 * | 6/2005 | Pan et al. | 715/515 |
| 2005/0160082 A1 * | 7/2005 | Dawson | 707/3 |
| 2006/0173806 A1 * | 8/2006 | Bruecken | 707/1 |
| 2006/0282797 A1 * | 12/2006 | Barsness et al. | 715/864 |

(Continued)

OTHER PUBLICATIONS

David A. Huffman, "A Method for the Construction of Minimum-Redundancy Codes," Proceedings of the I.R.E., Sep. 1952, pp. 1098-1102.

"ONIX for Books, Product Information Format XML Technical Notes," Edit EUR Jointly with Book Industry Study Group, New York, and Book Industry Communication, London (2009).

(Continued)

*Primary Examiner* — Lamont Spooner
(74) *Attorney, Agent, or Firm* — Fish & Richardson P.C.

(57) ABSTRACT

Systems and techniques for providing definitions to a user. The provision embodies the context of a text in which the defined term appears. In one aspect, a system includes an electronic device that includes one or more data processing devices programmed to respond to receipt of the user selection of the first term by performing operations. The operations include accessing, from the one or more persistent data storage devices, the characterizations of the contexts of the texts, comparing the accessed characterizations of the contexts of the texts with one or more characteristics of the context of the textual content of a media file, and ranking the definitions of the first term according to respective likelihoods that the definitions appropriately characterize the usage of the first term within the textual content of the media file.

20 Claims, 9 Drawing Sheets

(56) References Cited

U.S. PATENT DOCUMENTS

| | | |
|---|---|---|
| 2007/0028184 A1 | 2/2007 | Jang |
| 2007/0150470 A1 | 6/2007 | Brave et al. |
| 2007/0156761 A1* | 7/2007 | Smith .................. 707/104.1 |
| 2008/0052273 A1* | 2/2008 | Pickens ........................ 707/3 |
| 2008/0140652 A1* | 6/2008 | Millman et al. ............... 707/6 |
| 2008/0141182 A1* | 6/2008 | Barsness et al. ........... 715/864 |
| 2008/0154582 A1* | 6/2008 | Bruecken .................... 704/10 |
| 2009/0063546 A1* | 3/2009 | Sullivan et al. ............ 707/102 |
| 2009/0106206 A1* | 4/2009 | Sherman ....................... 707/3 |
| 2009/0292686 A1 | 11/2009 | Carter et al. |
| 2010/0005087 A1* | 1/2010 | Basco et al. .................. 707/5 |
| 2010/0036829 A1* | 2/2010 | Leyba .......................... 707/5 |
| 2010/0169367 A1 | 7/2010 | Lee et al. |
| 2010/0278453 A1* | 11/2010 | King ........................ 382/321 |
| 2011/0047152 A1* | 2/2011 | Smith, III .................. 707/723 |

OTHER PUBLICATIONS

"ONIX for Books, Product Information Format Data Element Summary," Edit EUR Jointly with Book Industry Study Group, New York, and Book Industry Communication, London (2009).

"ONIX for Books, Product Information Format Specification," Edit EUR Jointly with Book Industry Study Group, New York, and Book Industry Communication, London (2009).

Authorized officer Sang Hyun Park, International Search Report and Written Opinion in PCT/US2011/057658, mailed Jun. 1, 2012, 10 pages. (2535WO1).

Howe, weighted search Aug. 28, 1998, The Free On-Line Dictionary of Computing, http://foldoc.org/weight.

Fausett, Fundamentals of Neural Networks: Architectures, Algorithms and Applications 1994, Prentice-Hall, p. 436.

Russell, Clean and store your raw tags like Flickr Jun. 19, 2007, This Old Network, http://weblog.terrellrussell.com/2007/06/cleanand-store-your-raw-tags-like-flickr/.

* cited by examiner

| TERM | CONFIRMED DEFINITION | DATE PUBLISHED | AUTHOR REGION | SUBJECT |
|---|---|---|---|---|
| ... | ... | ... | ... | ... |
| server | 1 | 1985 | US | |
| | 1 | 2010 | US | LAW |
| | 2 | 1969 | US | |
| | 1 | 2004 | US | |
| | 6 | 1623 | IRE | |
| | 1 | 1977 | GB | |
| | 1 | 2010 | US | GENERAL |
| | ... | ... | ... | ... |

1505  1515  1520  1525  1530

PROVIDING DEFINITIONS THAT ARE SENSITIVE TO THE CONTEXT OF A TEXT

CROSS-REFERENCE TO RELATED APPLICATION

This application is a continuation of U.S. application Ser. No. 13/076,685, filed Mar. 31, 2011, which claims priority under 35 U.S.C. §119(e) to U.S. Provisional Patent Application Ser. No. 61/422,424, filed on Dec. 13, 2010, the contents of which are incorporated herein by reference.

BACKGROUND

This specification relates to the provision of definitions by an electronic book reader or other electronic device.

Users can read textual content displayed by a variety of different electronic devices. For example, browsers can render electronic documents available on the Internet or elsewhere. Dedicated "book reader" hardware platforms can display electronic books and other electronic media. Software applications with functionality that resembles the functionality of dedicated hardware platforms can execute on portable electronic devices.

Many electronic devices that display textual content also provide dictionary look-ups of terms in the text. For example, a user can highlight or otherwise select a term in the displayed text. In response, the electronic device looks up a definition of the selected term and displays the definition. If more than one definition is available, electronic devices can provide the definitions one-by-one or together.

SUMMARY

This specification describes technologies relating to the provision of definitions to a user. The provision embodies the context of a text in which the defined term appears.

In a first aspect, a system includes an electronic device that includes one or more display screens configured to display the textual content of a media file, one or more input elements configured to receive a user selection of the first term, and one or more data processing devices programmed to respond to receipt of the user selection of the first term by performing operations. The operations include accessing, from the one or more persistent data storage devices, the characterizations of the contexts of the texts, comparing the accessed characterizations of the contexts of the texts with one or more characteristics of the context of the textual content of the media file, and ranking the definitions of the first term according to respective likelihoods that the definitions appropriately characterize the usage of the first term within the textual content of the media file.

In a second aspect, a method is performed by a system of one or more data processing devices. The method includes receiving, by the system, user selection of a term found in a text displayed by the system, determining, by the system, one or more of a historical context of the text, a geographical context of the text, or a subject matter context of the text, comparing, by the system, the one or more of the historical, the geographic, and the subject matter contexts of the text to one or more characteristics of different definitions of the selected term, ranking, by the system, the different definitions of the selected term based at least in part on a result of the comparison and displaying, by the system, one or more of the different definitions according to the ranking of the different definitions.

In a third aspect, a system of electronic devices includes a plurality of electronic devices each comprising one or more data processors programmed to receive user confirmations of the propriety or impropriety of different definitions for characterizing usage of a first term in different texts and a communication interface configured to output messages characterizing the user confirmations and the different texts.

In a fourth aspect, a method implemented by a system of one or more data processing devices includes receiving, at the system from a plurality of remote electronic devices, a plurality of messages characterizing user confirmations of the propriety or impropriety of different definitions for characterizing usages of a first term in different texts, storing information characterizing the definitions and the texts in one or more persistent data storage devices, analyzing, by the system, the information stored at the one or more persistent data storage devices to determine weights that represent likelihoods that the different definitions appropriately characterize usages of the first term, and outputting the weights from the system.

In a fifth aspect, a server system on a data communications network comprises one or more persistent data storage devices storing multiple definitions of a first term, each of the definitions stored in association with a characterization of a context of texts in which the definition appropriately characterizes usage of the first term, a data communication element to receive a characterization of a first text that is displayed at a remote electronic device and an identification of a first term in the first text, the first term having been selected for provision of a definition, and one or more data processing devices programmed to respond to receipt of the identification of the first term and the characterization of the first text by performing operations. The operations include accessing, from the one or more persistent data storage devices, the characterizations of the contexts of the texts that are stored in association with the definitions of the first term, comparing the accessed characterizations of the contexts of the texts with one or more characteristics of the context of the first text, and ranking the definitions of the first term according to respective likelihoods that the definitions appropriately characterize the usage of the first term within the first text.

The first, the second, the third, the fourth, the fifth, and other aspects can include one or more of the following features. An electronic device can include one or more persistent data storage devices storing multiple definitions of a first term and a media file that includes textual content. An electronic device can include one or more data communication devices that is capable of accessing multiple definitions of a first term and a media file that includes textual content from one or more persistent data storage devices. Each of the definitions can be stored in association with a characterization of a context of texts in which the definition appropriately characterizes usage of the first term. The textual content can include the first term. The multiple definitions of the first term can be stored in different dictionaries. Each of multiple dictionaries can include definitions that appropriately characterize term usage in different contexts. Media files can include metadata characterizing the textual content. One or more data processing devices can be programmed to access the metadata to determine the one or more characteristics of the context of the textual content. One or more characteristics of the context of the textual content can be determined from indications found within the textual content. A context of the first term can be determined within the textual content of the media file. Definitions can be ranked based on both the determined context of the first term within the textual content and results of the comparison of the characterizations of the contexts of the texts and the one or more characteristics of the context of the textual content. A system can include a syntactic analyzer that determines the syntactic context of the first term within the textual content of the media file. At least some of the definitions can be stored in association with characterizations of time periods. One or more data processing devices can be programmed to compare the time periods with a date when the text was authored. One or more data processing devices is programmed to analyze the textual content of the media files to determine the characterizations of the contexts of the texts. At least some definitions can be stored in association with characterizations of subject matter. One or more data processing devices can programmed to compare the subject matter with a subject matter of the textual content of the media file. At least some definitions can be stored in association with characterizations of geographic contexts. One or more data processing devices is programmed to compare the geographic context associated with the definitions with a geographic context of the textual content of the media file. A system can receive a user confirmation of the propriety or impropriety of a displayed definition. User selection of a second term found in the text can be received. A system can rank different definitions of the second term based at least in part on the user confirmation of the propriety or impropriety of the definition of the first term. A system can display one or more of the different definitions of the second term according to the ranking of the different definitions of the second term. A message characterizing user confirmation of the propriety or impropriety of a displayed definition can be transmitted to a remote dictionary data system. One or more of the historical, the geographic, and the subject matter contexts of the text can be determined by searching the text for textual indications of the one or more of the historical, the geographic, and the subject matter contexts of the text. One or more of the historical, the geographic, and the subject matter contexts of the text can be determined by accessing metadata in a media file that includes the text and comparing the metadata with the textual indications. A system can include a dictionary data system that includes a communication interface configured to receive the messages output by the electronic devices in the plurality and one or more persistent data storage devices storing characterizations of the user confirmations received from the electronic devices in the plurality. An electronic device, or each of a plurality of electronic devices, can include one or more persistent data storage devices storing multiple definitions of a first term, each of the definitions stored in association with a characterization of a context of texts in which the definition appropriately characterizes usage of the first term and a media file that includes textual content, the textual content including the first term, one or more display screens configured to display the textual content of the media file, one or more input elements configured to receive a user selection of the first term, and one or more data processing devices programmed to respond to receipt of the user selection of the first term by performing operations. The operations can include accessing, from the one or more persistent data storage devices, the characterizations of the contexts of the texts, comparing the accessed characterizations of the contexts of the texts with one or more characteristics of the context of the textual content of the media file, and ranking the definitions of the first term according to respective likelihoods that the definitions appropriately characterize the usage of the first term within the textual content of the media file. Weights can be outputted by distributing the weights to at least some of the remote electronic devices.

The details of one or more implementations are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
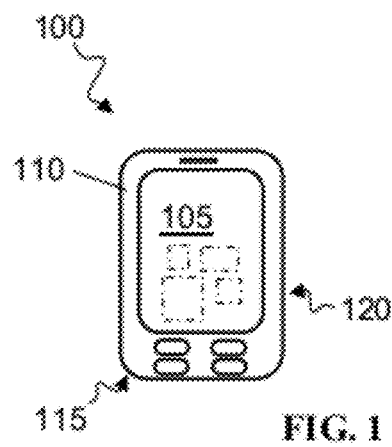
FIG. 1 is a schematic representation of an electronic device that includes a display screen that can display textual content to be read by a user.

FIG. 1 is a schematic representation of an electronic device 100 that includes a display screen 105 that can display textual content to be read by a user. Electronic device 100 can be, e.g., a desk- or laptop computer, a smart phone, a PDA, a dedicated book reader, or the like. Electronic device 100 includes a housing 110 and one or more input elements 115 that afford a user the ability to select a term within textual content displayed on screen 105. Housing 110 supports display screen 105 and input elements 115 and houses a collection 120 of electronic components that respond to such a user selection by providing one or more definitions of the selected term. As described further below, such provision is sensitive to the context of the displayed textual content.

Input elements 115 are input devices that can receive input from a user. Input elements 115 can include one or more key, pad, trackball, or other component that receives mechanical, audio, or other input from a user. In some implementations, input elements 115 can include display screen 105. In particular, display screen 105 can be a touch screen that acts as both an input and an output by sensing the position and movement of a user's finger or other elements. The sensed information can be translated to allow a user to access functionality provided by electronic device 100. As described further below, in some implementations user interaction with input elements 115 can be effective not only to select a term displayed on screen 105 for the context-sensitive provision of one or more definitions, but also to confirm the propriety or impropriety of a definition that has been provided.

Collection 120 can include hardware components, software components, or combinations of hardware and software components that are configured not only to interpret user interaction with input elements 115 but also to perform data processing and other activities responsive to that user interaction. The activities can include definition provision that is sensitive to the context of the textual content and the receipt and handling of confirmations of the propriety or impropriety of definitions of terms in different contexts.

Figure 2:
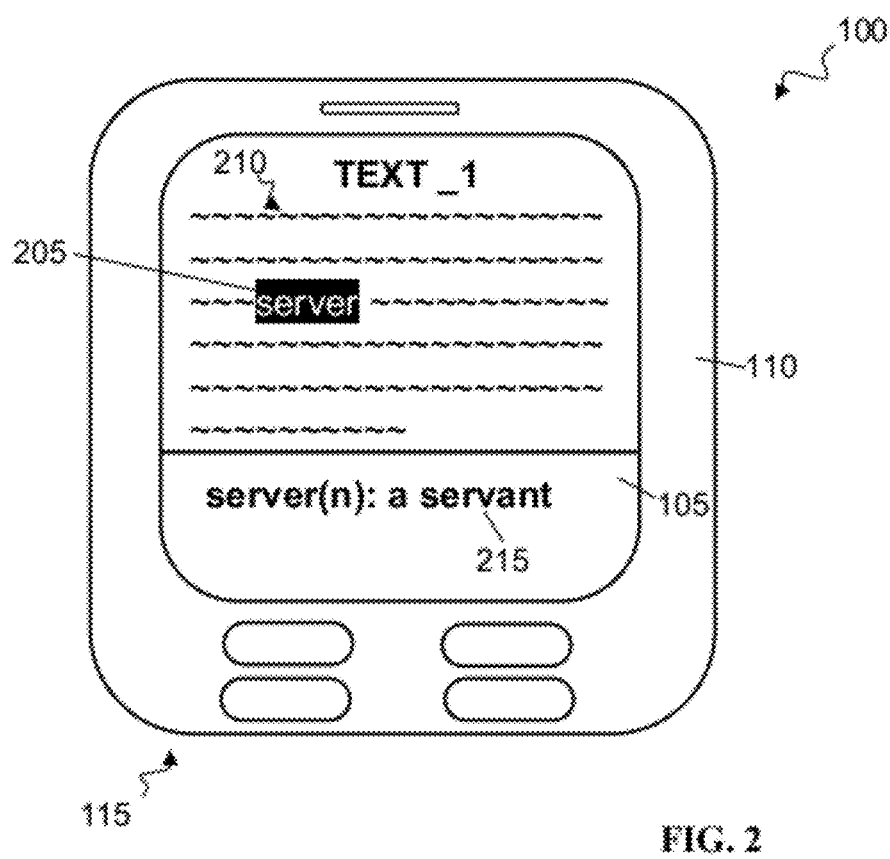
FIGS. 2, 3, and 4 schematically illustrate context-sensitive provision of definitions of selected terms by the electronic device of FIG. 1.
Figure 3:
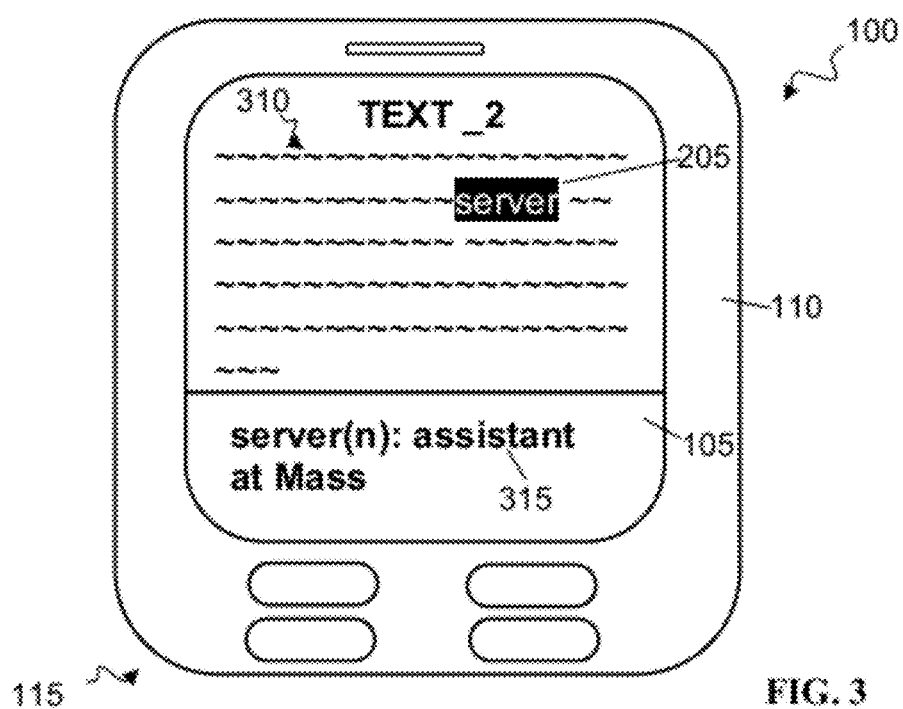
Figure 4:
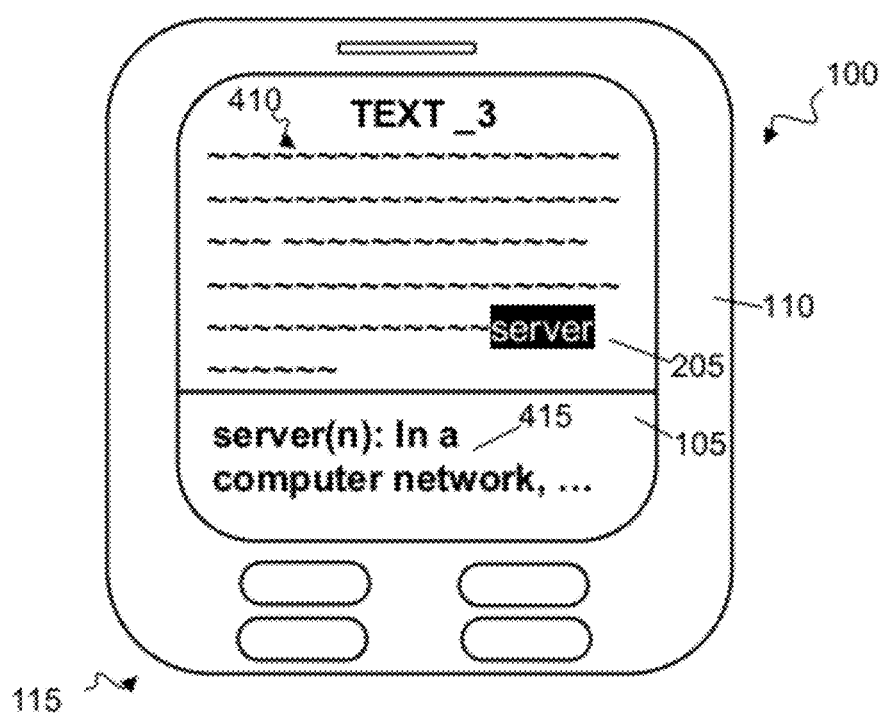

FIGS. 2, 3, and 4 schematically illustrate context-sensitive provision of definitions of selected terms by electronic device 100. In FIG. 2, electronic device 100 has received a user selection of a term 205 (i.e., "server") in a first text 210 (i.e., "text_1") that is displayed on display screen 105. The user selection triggers provision of a definition 215 of term 205. In FIG. 3, electronic device 100 has received a user selection of the same term 205 (i.e., "server"), albeit in a second text 310 (i.e., "text_2"). The user selection triggers provision of a second definition 315 of term 205. As shown, definition 315 differs from definition 215. In FIG. 4, electronic device 100 has received a user selection of the same term 205 (i.e., "server"), albeit in a third text 410 (i.e., "text_3"). The user selection triggers provision of a third definition 415 of term 205. As shown, definition 415 differs from both definitions 215, 315.

Different definitions 215, 315, 415 are thus provided by electronic device 100 notwithstanding user selection of the same term 205. In particular, the provision of definitions 215, 315, 415 changes as the text in which term 205 appears changes. Although the user only selects a single term 205, electronic device 100 uses features of texts 210, 310, 410 in which term 205 appears to provide different definitions 215, 315, 415. As described further below, those features can characterize the usage of term 205 within texts 210, 310, 410 as well as the contextual environment of texts 210, 310, 410 themselves within a broader context.

Although definitions 215, 315, 415 are shown displayed in a lower portion of display screen 105, definitions 215, 315, 415 can also be displayed, e.g., in a sidebar, a pop-up window, or elsewhere on display screen 105. Further, in some implementations, more than one definition is displayed on display screen 105.

Figure 5:
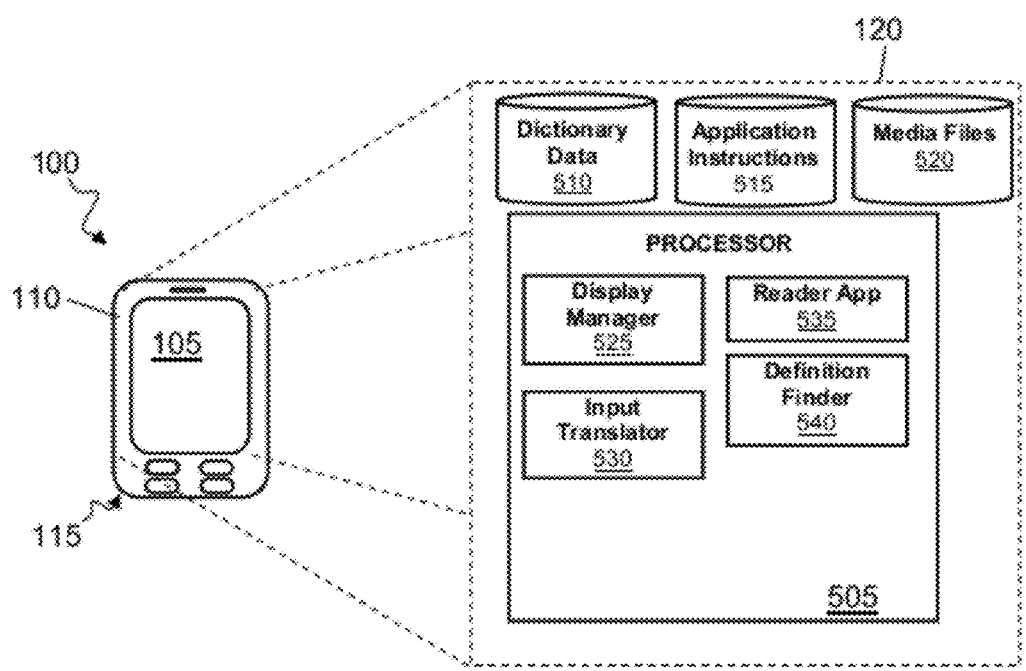
FIG. 5 is a schematic representation of one example implementation of the electronic device of FIG. 1 that is sensitive to the context of text in providing one or more definitions of a term.

FIG. 5 is a schematic representation of one example implementation of electronic device 100 that is sensitive to the context of text in providing one or more definitions of a term. In the illustrated implementation, electronic component collection 120 includes a digital data processor 505, a dictionary data store 510, an application instruction store 515, and a media file store 520. Digital data processor 505 is a system of one or more data processing devices that perform operations in accordance with one or more sets of machine-readable instructions. For example, digital data processor 505 performs operations in accordance with the machine-readable instructions stored in application instruction store 515. Application instruction store 515 is a collection of one or more persistent data storage devices that stores machine-readable instructions for implementing applications. Among the applications that can be implemented by digital data processor 505 are a display manager 525, an input translator 530, a reader application 535, and a definition finder application 540. Processor 505 can be implemented using digital electronic circuitry, or in computer software, firmware, hardware, or combinations thereof.

Display manager 525 is a software component that configures data processor 505 to present textual and other content on display screen 105. Display manager 525 can receive instructions for displaying content, e.g., from reader application 535. The instructions can direct display manager 525 to display content found in media file store 520, including, e.g., electronic books, articles, and other electronic documents.

Input translator 530 is a software component that configures data processor 505 to interpret user interaction with input elements 115. For example, input translator 530 can configure data processor 505 to determine whether to interpret user interaction as a user selection of a term that triggers context-sensitive provision of one or more definitions of the term. As another example, in some implementations, input translator 530 can configure data processor 505 to recognize a user's confirmation of the propriety or impropriety of a definition of a term that has been received over input elements 115.

Reader application 535 is a software component that configures data processor 505 to display textual and other content on display screen 105 for reading by a user. For example, reader application 535 can provide functionality that allows a user to select the content that is to be displayed, navigate through the displayed content, and view information characterizing the content, such as title, author, source, and the like. Reader application 535 can also provide information to display manager 525 that triggers the display of definitions of terms that are sensitive to the context of texts displayed under the direction of reader application 535.

Definition finder 540 is a software component that configures data processor 125 to locate context-sensitive definitions for terms in a dictionary data store 130. Definition finder 165 locates definitions by matching both a term and the context of the text in which the term appears to definitions in dictionary data store 130. Definition finder 165 can use a variety of different approaches to locate definitions depending, e.g., on the structuring of dictionary data store 130 and the context being matched. Examples of such approaches are described further below.

Media file store 520 is a collection of one or more persistent data storage devices that store media files that include textual content. The media files in store 520 can be, e.g., electronic books, articles, or other items that include text. The media files in store 520 can be stored in a variety of different formats including, e.g., text, hypertext, the TOMERAIDER format, the KINDLE format, LIBRIS, and others.

Figure 6:
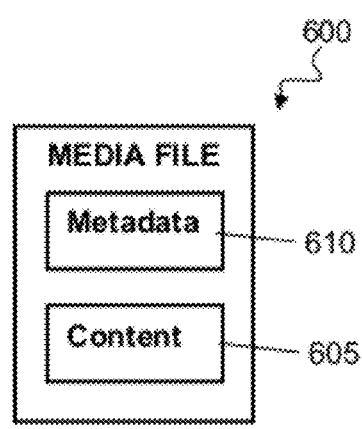
FIG. 6 is a schematic representation of a generic media file that can be stored in a media file store of the electronic device of FIG. 5.

FIG. 6 is a schematic representation of a generic media file 600 that can be stored in media file store 520. Media file 600 includes both media content 605 and metadata 610. Media content 605 includes information characterizing text that can be displayed, e.g., on display screen 105. Metadata 610 includes information characterizing media content 605 as a whole. For example, metadata 610 can include information characterizing the title, author, and publication date of the content in media content 605. In some implementations, metadata 610 can also include additional information characterizing media content 605, including, e.g., publisher, publisher address, location where printed, ISBN number, author's date of birth, and the like. In some implementations, media content 605 and metadata 610 are stored together in a single media file 600 that is identified by a single name. In other implementations, media content 605 and metadata 610 are stored in separate media files that are identified by different names and that can be accessed separately.

Returning to FIG. 5, dictionary data store 510 is a collection of one or more persistent data storage devices that store dictionary data suited for the provision of context-sensitive definitions of terms. Dictionary data store 510, application instruction store 515, and media file store 520 can be stored on the same persistent data storage device or on different persistent data storage devices. In some implementations, dictionary data suited for the provision of context-sensitive definitions of terms can be stored remotely from electronic device 100, as described further below.

Figures 7, 8:
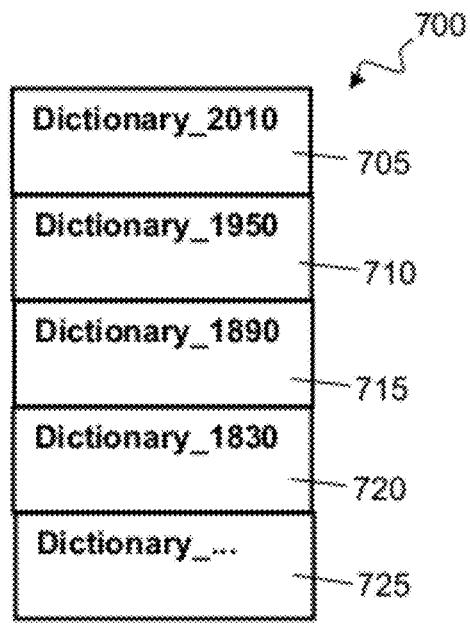
FIGS. 7-10 are schematic representations of collections of dictionary data that are suited for the context-sensitive provision of definitions of terms.

FIG. 7 is a schematic representation of a first collection 700 of dictionary data that is suited for the context-sensitive provision of definitions of terms. Dictionary data collection 700 can be stored in dictionary data store 510. Dictionary data collection 700 includes different dictionaries 705, 710, 715, 720, 725. Each of dictionaries 705, 710, 715, 720, 725 includes definitions characteristic of term usage in different contexts. In particular, dictionary 705 includes definitions that are characteristic of term usage during a first period in time, namely, in the vicinity of 2010. Dictionary 710 includes definitions that are characteristic of term usage during a second period in time, namely, in the vicinity of 1950. Dictionary 715 includes definitions that are characteristic of term usage during a third period in time, namely, in the vicinity of 1890. Dictionary 720 includes definitions that are characteristic of term usage during a fourth period in time, namely, in the vicinity of 1830. Dictionary 725 includes definitions that are characteristic of term usage during yet another period in time. In some implementations, dictionaries 705, 710, 715, 720, 725 that were published on a particular date are initially taken as including definitions characteristic of term usage during a period that includes that particular publication date.

The periods in time for which dictionaries 705, 710, 715, 720, 725 appropriately characterize term usage are contexts that can be matched to the context of texts from which terms are selected for look-up, as described further below.

FIG. 8 is a schematic representation of a second collection 800 of dictionary data that is suited for the context-sensitive provision of definitions of terms. Dictionary data collection 800 can be stored in dictionary data store 510. Dictionary data collection 800 includes different dictionaries 805, 810, 815, 820, 825, 830, 835, 840, 845, 850. Each of dictionaries 805, 810, 815, 820, 825, 830, 835, 840, 845, 850 includes definitions that are characteristic of term usage in different contexts. In particular, dictionary 805 includes definitions that are characteristic of British usage during a first period of time, namely, in the vicinity of 2010. Dictionaries 810, 815, 820, 825 includes definitions that are characteristic of British usage during other periods in time. Dictionary 830 a includes definitions that are characteristic of usage in the United States of America during the first period in time, namely, in the vicinity of 2010. Dictionaries 835, 840, 845, 850 includes definitions that are characteristic of usage in the United States of America during other periods in time. In some implementations, dictionaries 805, 810, 815, 820, 825, 830, 835, 840, 845, 850 that were published for a particular geographic market are initially taken as including definitions characteristic of term usage in that geographic market, e.g., as of a particular publication date.

The periods in time and regions for which dictionaries 805, 810, 815, 820, 825, 830, 835, 840, 845, 850 appropriately characterize term usage are contexts that can be matched to the context of texts in which terms selected for look-up appear, as described further below.

Figures 9, 10:
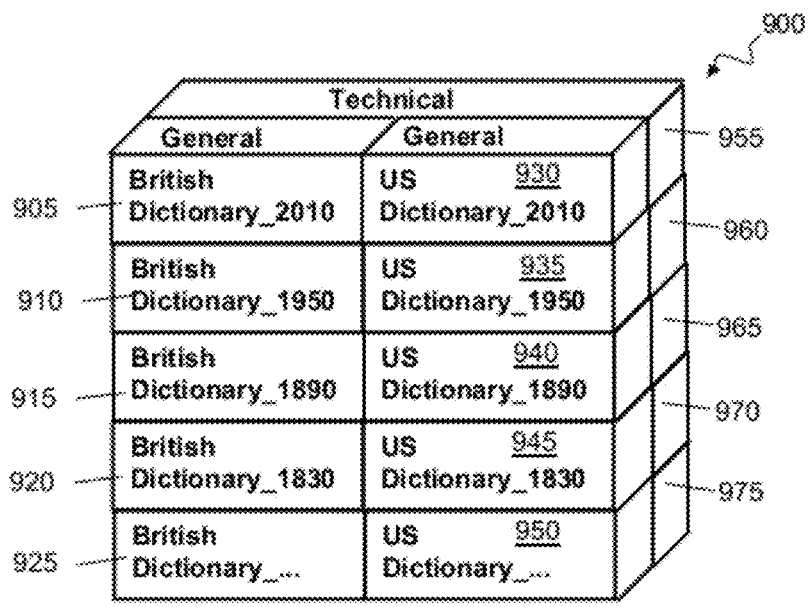

FIG. 9 is a schematic representation of a third collection 900 of dictionary data that is suited for the context-sensitive provision of definitions of terms. Dictionary data collection 900 can be stored in dictionary data store 510. Dictionary data collection 900 includes different dictionaries 905, 910, 915, 920, 925, 930, 935, 940, 945, 950, 955, 960, 965, 970, 975. Each of dictionaries 905, 910, 915, 920, 925, 930, 935, 940, 945, 950, 955, 960, 965, 970, 975 includes definitions that are characteristic of term usage in different contexts. In particular, dictionary 905 includes definitions that are characteristic of general British usage during a first period of time, namely, in the vicinity of 2010. Dictionaries 910, 915, 920, 925 includes definitions that are characteristic of general British usage during other periods in time. Dictionary 930 includes definitions that are characteristic of general usage in the United States of America during the first period in time, namely, in the vicinity of 2010. Dictionaries 935, 940, 945, 950 includes definitions that are characteristic of general usage in the United States of America during other periods in time. Dictionary 955 includes definitions that are characteristic of technical usage during the first period in time, namely, in the vicinity of 2010. Dictionaries 960, 965, 970, 975 includes definitions that are characteristic of technical usage during other periods in time.

The subject or field, periods in time, and regions for which dictionaries 905, 910, 915, 920, 925, 930, 935, 940, 945, 950, 955, 960, 965, 970, 975 appropriately characterize term usage are contexts that can be matched to the context of texts from which terms are selected for look-up, as described further below.

FIG. 10 is a schematic representation of a fourth collection 1000 of dictionary data that is suited for the context-sensitive provision of definitions of terms. Dictionary data collection 1000 can be stored in dictionary data store 510.

In the illustrated implementation, dictionary data collection 1000 is structured as a data table of different definitions that are indexed by terms in column 1005. Dictionary data collection 1000 also includes different definitions 1010 of the indexed terms, as well as information 1015 characterizing a time a respective definition began to characterize usage (if available), information 1020 characterizing a time when a respective definition stopped characterizing usage (if available), information 1025 characterizing a region in which term usage is accurately characterized by a respective definition (if available), and information 1030 characterizing a subject or field in which term usage is accurately characterized by a respective definition (if available).

The subject or field, periods in time, and regions to which different definitions 1010 are associated are characteristics of the definition that can be matched to the context of texts from which terms are selected for look-up, as described further below.

In operation, electronic devices (such as, e.g., electronic device 100) can access collections of dictionary data (such as, e.g., collections 700, 800, 900, 1000) and provide one or more definitions drawn from that dictionary data. The provision of definitions is sensitive to the context of a media file (such as media file 600) that is currently being displayed. For example, in some implementations, an electronic device only provides a single definition that is the most likely to appropriately a term. As another example, in other implementations, an electronic device provides multiple definitions in an order that reflects the likelihood that the definitions appropriately define the term. In either of these examples, a device may include functionality that receives a user selection for navigating to one or more additional definitions should the definition(s) that are initially provided prove unsatisfactory. The additional definition(s) can be, e.g., a single definition that is the next most likely to be appropriate for the context of a text or a group of multiple definitions that are provided in an order that reflects the likelihood that they are appropriate for the context of a text. In some implementations, a device may include functionality that receives user feedback characterizing the propriety or impropriety of one or more definitions, as discussed further below.

Figure 11:
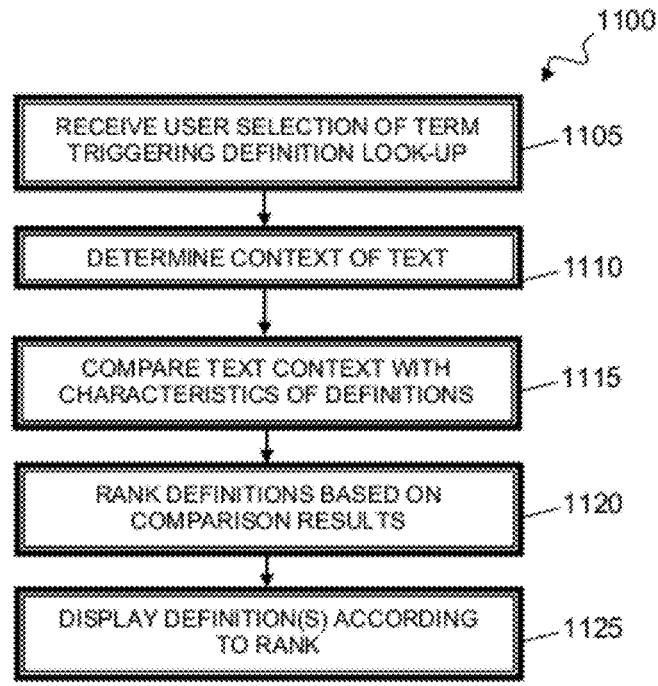
FIG. 11 is a flowchart of a process for the provision of definitions of terms that is sensitive to the context of the text in which the term appears.
Figure 16:
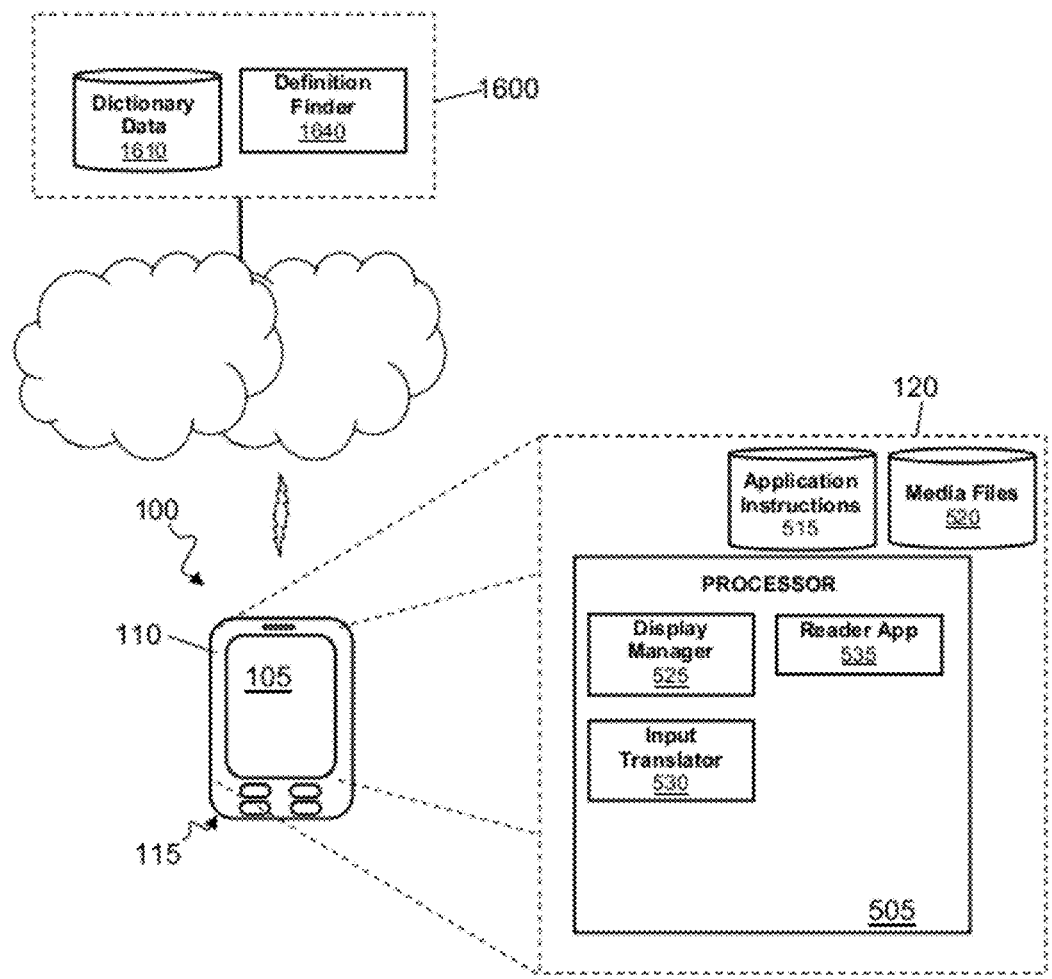
FIG. 16 is a schematic representation of another example implementation of electronic device that is sensitive to the context of text in providing one or more definitions of a term.

FIG. 11 is a flowchart of a process 1100 for the provision of definitions of terms that is sensitive to the context of the text in which the term appears. Process 1100 can be performed by a system of one or more data processing devices that perform operations in accordance with the logic of one or more sets of machine-readable instructions. The instructions can be tangibly embodied in hardware, in software, or in combinations thereof. For example, process 1100 can be performed by a definition finder application 540 executed by digital data processor 505 in electronic device 100. As another example, process 1100 can be performed by a system of electronic devices and a remote dictionary data system such as, e.g., system 1400 (FIG. 14). As yet another example, process 1100 can be performed by a definition finder application 1640 performed by a server system on a data communications network that communicates with a remote electronic device over a data communication network, such as e.g., system 1600 (FIG. 16). Process 1100 can be performed alone or in conjunction with other activities. For example, process 1100 can be performed in conjunction with process 1300 (FIG. 13), as described further below.

The system performing process 1100 receives a user selection of a term in a text that triggers the look-up of a definition at 1105. The term is generally in text that is displayed on a display screen. The user selection can be received over one or more input elements such as, e.g., input elements 115 and/or a touch screen display screen 105. The definition look-up can be triggered e.g., by user input identifying a term or by a combination of user input identifying a term with other input, such as user interaction with a particular input element or region on a touch screen. In some cases, a single user selection may select more than one term from a text and definition look-up for the multiple terms can be triggered. In some instances, the user selection can be received at a server system from a remote electronic device over a data communications network. For example, the remote electronic device can transmit one or more messages that identify a text displayed at the remote electronic device and a term in the text that has been selected for provision of a definition.

The system performing process 1100 determines the context of the text in which the selected term appears at 1110. The context of a text is one or more characteristics of the text in which the term appears. Please note that the characteristics and context of the text differ from the characteristics and context of the term within the text. In other words, a term may have a particular semantic and/or syntactic context (e.g., play a particular grammatical role and be surrounded by other terms that indicate the meaning of that term) within a text. Although such a term context can also be considered in the provision of definitions (e.g., as described below), the contextual environment of the text can be characterized by historical context, the geographic context, and other contextual features of the text as a whole. For example, the date when a text was authored is a characteristic of the historical context of the text. The country where the author lived is a characteristic of the geographical context of the text. The matter under consideration in a text is a characteristic of the subject matter of the text. The identity of the author, or membership of the author in a particular group, is itself also a characteristic of the context of the text.

The system performing process 1100 can determine the context of the text in which a selected term appears using a variety of different approaches. In some implementations, the context of the text can be determined from metadata in a media file that includes the text, such as metadata 610 (FIG. 6). For example, the first publication date of a text, the identity of the author, and/or the date when a text was translated into the language in which it is displayed can be determined from metadata in a media file to place the text in historical context. As another example, the country of residence of an author and/or a translator can be determined from such metadata to place the text into geographic context. As yet another example, a Dewey Decimal System and/or other subject matter classification of a text can be determined from such metadata to place the text into subject matter context. In some implementations, if such information is not available in the metadata in a particular media file, any available metadata or even a snippet of text can be used to look up such information, e.g., on the Internet so that the context of the text can be determined. Such metadata can be human-curated, or derived from automated analysis of the text, or both human-curated and derived from automated analysis of the text.

In some implementations, the context of a text can be determined from an analysis of the content of the text itself. For example, the system performing process 1100 can search a text for textual indications of the historical, subject matter, and geographic context of the text. For example, terminology that is associated with certain times periods (e.g., "Gatling gun," thee/thy/thou, tweet), terminology that is associated with particular geographical regions (e.g., "colour" vs. "color," "realise" vs. "realize"), and terminology that is associated with particular subject matter (e.g., "field-effect transistor" and "transubstantiation") can be used to determine the context of a text.

In some implementations, the context of a text can be determined from both metadata in a media file that includes the text and an analysis of the content of the text itself, or one of these may outweigh the other in a determination of the context of a text. This is particularly useful in instances where a text from one context seeks to mimic texts from another context. For example, a historical romance written by an American author in 2007 may mimic terminology and other textual features that are characteristic of Victorian England. Even though media file metadata characterizing the historical romance may place the historical romance in one context, terminology and other textual features may place the historical romance in a different context.

The system performing process 1100 compares the context of the text with characteristics of different definitions of the selected term at 1115. For example, the historical context, geographic context, and subject matter context of a text can be compared to the time, geography, and subject matter for which different dictionaries (e.g., dictionaries 705-725, 805-850, 905-975) appropriately characterize term usage. As another example, the historical context, geographic context, and subject matter context of a text can be compared to the characteristics of different definitions that are enunciated in a single collection of dictionary data (e.g., dictionary data collection 1000).

The system performing process 1100 ranks the different definitions of the selected term based at least in part on the results of the comparison of the text context with characteristics of the different definitions at 1120. The rankings can embody the likelihood that the different definitions appropriately define the selected term within a text drawn from that context and need not be exclusively based on the results of the comparison at 1115. For example, the rankings can embody other factors including, e.g., how often a term in a particular context is appropriately defined by a particular definition and the context of the term within the text (including, e.g., the grammatical role of the term and the meaning of other terms that surround the term within the text).

The system performing process 1100 displays one or more definitions of the selected term in accordance with these rankings at 1125. For example, a single definition that is the most likely to be appropriate can be displayed. As another example, multiple definitions can be displayed in an order that reflects the likelihood that the definitions are appropriate. The one or more definitions can be displayed at the same device that performs the remainder of process 1100 or the one or more definitions can be displayed at a remote electronic device that exchanges data with the device that performs the remainder of process 1100 over a data communications network.

Figure 12:
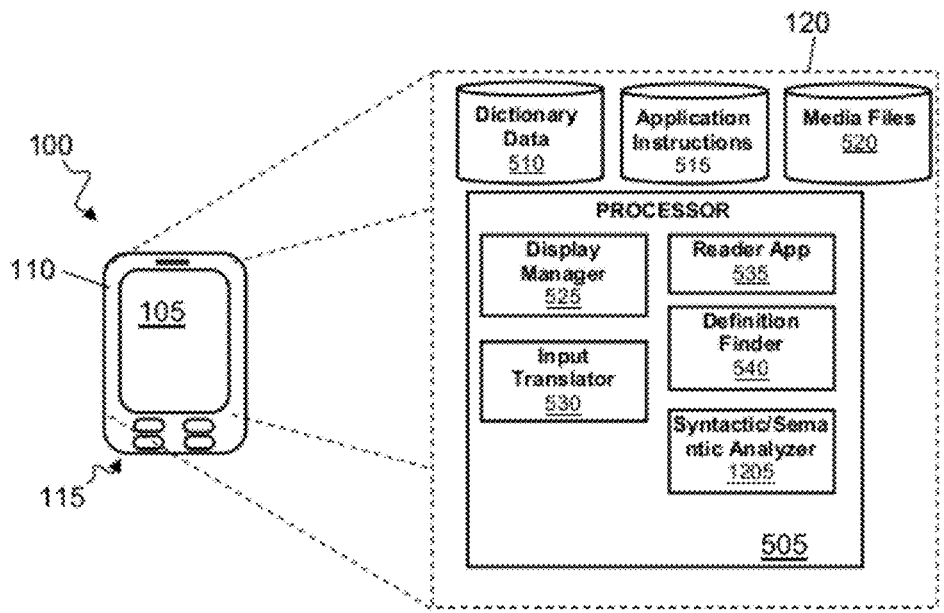
FIG. 12 is a schematic representation of another example implementation of the electronic device of FIG. 1 that is sensitive to the context of text in providing one or more definitions of a term.

FIG. 12 is a schematic representation of another example implementation of electronic device 100 that is sensitive to the context of text in providing one or more definitions of a term. In addition to digital data processor 505, dictionary data store 510, application instruction store 515, and media file store 520, the illustrated implementation of electronic component collection 120 includes a syntactic and/or semantic analyzer 1205. Syntactic and/or semantic analyzer 1205 is a software component that configures data processor 505 to analyze the linguistic context of terms and other units within a text. For example, syntactic and/or semantic analyzer 1205 can determine the grammatical role played by a term and identify a likely meaning of term based on other terms and content that surrounds the term within the text.

The results generated by syntactic and/or semantic analyzer 1205 can be used by definition finder 165 to locate definitions for terms in a dictionary data store 130 that are sensitive to both the context of the text and the context of the term within the text. For example, syntactic and/or semantic analyzer 1205 can output information characterizing a term that has been selected by a user as a the subject of a sentence, a predicate, a verb, or other grammatical element. The characterization of the selected term can be used by definition finder 165, in conjunction with the context of the text in which the selected term appears, to rank different definitions of the selected term according to the likelihood that the different definitions appropriately define the selected term within the text (e.g., at 1120 in process 1100).

In some implementations, syntactic and/or semantic analyzer 1205 can output information characterizing the context of the text itself For example, syntactic and/or semantic analyzer 1205 can identify syntactic features, terminology, and/or other textual features that are characteristic of particular historical, geographic, and/or subject matter context. The characterization of the context of the text can be used by definition finder 165, alone or in conjunction with meta- or other data characterizing the text in which the selected term appears, to rank different definitions of the selected term according to the likelihood that the different definitions appropriately define the selected term within the text (e.g., at 1120 in process 1100).

Figures 13, 15:
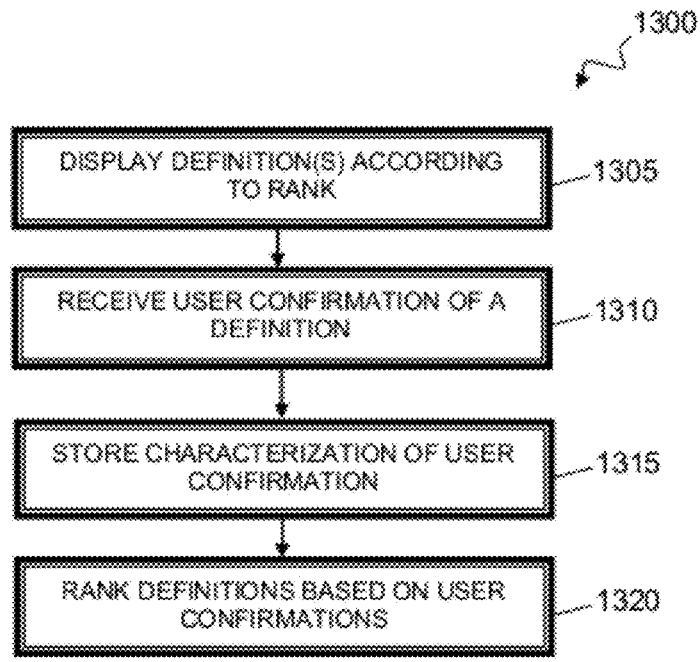
FIG. 13 is a flowchart of a process for the provision of definitions of terms that is sensitive to the context of the text in which the term appears.
FIG. 15 is a schematic representation of a data collection in which characterizations of user confirmations of the propriety or impropriety of definitions are stored.
Figure 14:
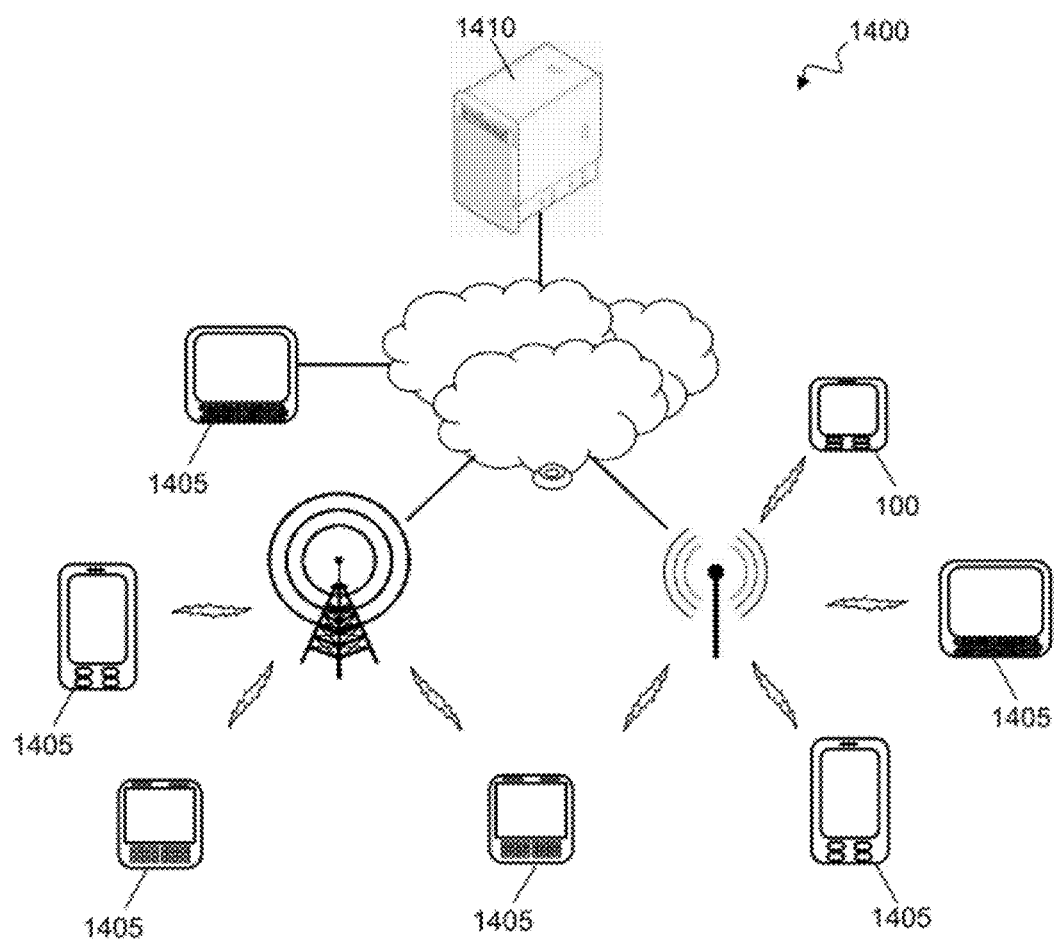
FIG. 14 is a schematic representation of an example of a system that can store characterizations of user confirmations of the propriety or impropriety of definitions.

FIG. 13 is a flowchart of a process 1300 for the provision of definitions of terms that is sensitive to the context of the text in which the term appears. Process 1300 can be performed by a system of one or more data processing devices that perform operations in accordance with the logic of one or more sets of machine-readable instructions. The instructions can be tangibly embodied in hardware, in software, or in combinations thereof. For example, process 1100 can be performed by a definition finder application 540 executed by digital data processor 505 in electronic device 100. As another example, process 1300 can be performed by a system that includes a central computer system in data communication with a variety of remote data processing devices. Process 1300 can be performed alone or in conjunction with other activities. For example, process 1300 can be performed in conjunction with process 1100 (FIG. 11).

The system performing process 1300 displays one or more definitions of the selected term in accordance with these rankings at 1305. For example, a single definition that is the most likely to be appropriate can be displayed. As another example, multiple definitions can be displayed in an order that reflects the likelihood that the definitions are appropriate.

The system performing process 1300 receives a user confirmation of the propriety or impropriety of a displayed definition at 1310. The user confirmation can be received over an input element of the device on which the definition is displayed. The user confirmation can be received in any of a variety of different forms. For example, the user confirmation can be received as a binary response to a query inquiring as to the propriety of a definitions (e.g., "Was this definition appropriate?" or "Was this definition inappropriate?"). As another example, the user confirmation can be received as a selection of one definition from amongst multiple definitions as the most appropriate. As yet another example, the user confirmation can be numerical or other grade characterizing the propriety or impropriety of a particular definition.

In some implementations, the receipt of user confirmations does not require affirmative input from the user but rather relies upon implicit signals. For example, if a system that initially displays a first definition of a term receives a subsequent request for an additional definition, then the system can interpret the request as a confirmation that the first definition is inappropriate. As another example, if the system separately displays a series of two or more definitions of a term in response to one or more user requests, an end to user requests for the display of additional definitions can be interpreted by the system as a confirmation that the definition displayed after the final user request is appropriate. As yet another example, if a user requests the display of another definition after a relatively short time period, this request can be can be interpreted by the system as indicative of the impropriety of the definition which is displayed. However, if a definition is displayed for a relatively longer time period, this display can be interpreted by the system as indicative of potential propriety of the displayed definition.

The system performing process 1300 stores a characterization of the user confirmation at 1315. The characterization can be stored in one or more persistent data storage devices and can include, e.g., information characterizing the term, the context of the text in which the term was found, and/or the semantic and/or syntactic context of the term within the text. For example, in implementations where process 1300 is performed by electronic device 100, the characterization of the user confirmation can be stored in one or more persistent data stores housed in electronic device 100.

FIG. 14 is a schematic representation of an example of another system 1400 that can store characterizations of user confirmations. System 1400 is a system of electronic devices that display content to a user and receive user confirmations of the propriety or impropriety of definitions of terms in the displayed content. System 1400 includes a first electronic device 100 that is associated with a first user, as well as a variety of other electronic devices 1405 that are associated with other users. Electronic devices 1405 can be, e.g., desk- or laptop computers, smart phones, PDAs, dedicated book readers, or the like.

Electronic devices 100, 1405 all include data communication components and exchange messages with a remote dictionary data system 1410. The data communication components can be wired or wireless and can include, e.g. mobile phone transceivers, WiFi transceivers, hardwired data connection transceivers, and the like. Electronic devices 100, 1405 are operable to exchange messages with dictionary data system 1410 using the data communication components.

Dictionary data system 1410 is a collection of one or more data processing devices that perform operations in accordance with the logic of one or more sets of machine-readable instructions. Dictionary data system 1410 is programmed to receive messages that include information characterizing user confirmations of the propriety or impropriety of displayed definitions from each of electronic devices 100, 1405 and store at least some record of those confirmations in a database or other persistent data store. Since the confirmations are made by a variety of users who are confirming the propriety or impropriety of different definitions in a variety of different texts, dictionary data system 1410 can assemble over time an aggregated characterization of the propriety or impropriety of different definitions in texts from different contexts.

FIG. 15 is a schematic representation of a data collection 1500 in which characterizations of user confirmations of the propriety or impropriety of definitions are stored. Data collection 1500 can be stored, e.g., at dictionary data system 1410 in one or more persistent data storage devices.

In the illustrated implementation, user confirmation data collection 1500 is structured as a data table of different confirmations that are indexed by the term whose definition was confirmed in column 1505. Each row in the illustrated implementation of user confirmation data collection 1500 characterizes a single confirmation event by a single user for a single text. User confirmation data collection 1500 includes numeric or other identifiers 1515 of the definitions of the indexed terms that were confirmed as appropriate by the different users, as well as information 1520, 1525, 1530 characterizing the context of the text for which the definition was confirmed to be appropriate. In the illustrated implementation, information 1520 characterizes the date on which the text was first published, information 1525 characterizes the region of the author, and information 1530 characterizes the subject matter of the text. In other implementations, the context of the text for which the definition was confirmed to be appropriate can be characterized in other ways.

In some implementations, user confirmation data collection 1500 also includes information characterizing the semantic and/or syntactic context of the term within the text. For example, user confirmation data collection 1500 can include a characterization of the part of speech of the term within the text and characteristics of other terms that were in the vicinity of the term in the text.

As user confirmations of the propriety or impropriety of different definitions are collected, user confirmation data collection 1500 can grow to become a unique representation of the usage of terminology in different contexts. In particular, human users can—one-by-one—provide confirmations of the propriety or impropriety of different term definitions in texts from different contexts. Over time, this collection of confirmations can characterize term usage in a large corpus of texts in a way that has previously been too costly to assemble.

Returning to FIG. 13, the system performing process 1300 ranks definitions based at least in part on the stored characterizations of user confirmation at 1320. For example, a statistical analysis of user confirmations of the propriety or impropriety of definitions can be used to determine parameters that represent the likelihood that different term definitions are appropriate for texts in different contexts. In some implementations, such a statistical analysis can be performed by a data processing system such as dictionary data system 1410 that aggregates user confirmations received from a variety of different devices and then distributes the results of the statistical analysis to those devices, e.g., for use in ranking different definitions of selected terms (e.g., at 1120 in process 1100 (FIG. 11)). Other machine-learning approaches, including neural-network-based approaches, can also rank definitions based at least in part on the stored characterizations of user confirmation.

In some implementations, user confirmations are weighted according to an estimate of the reliability of the user from whom the confirmation was received. For example, if the system has consistently received accurate confirmations from a user, then subsequent confirmations received from that user can be weighted more heavily than confirmations received from new users or from users from whom less accurate confirmations have been received. The weights assigned to user confirmations can impact the determination of parameters that represent the likelihood that different term definitions are appropriate for texts in different contexts. In particular, the determination of parameters can embody the likelihood than the more heavily weighted user confirmations are more likely to accurately identify appropriate definitions. The accuracy of user confirmations can be determined, e.g., by a voting mechanism in which multiple user confirmations are aggregated to identify a correct definition for a particular context (e.g., for a particular text).

In some implementations, if enough definitions are available to be aggregated, then the context for which definitions are ranked can include, e.g., texts authored by a particular group, texts authored by a particular individual, or the specific text in which the term appears.

In some implementations, definitions can be ranked by an electronic device based at least in part on the characterizations of user confirmations made at that same device. For example, user confirmations of term definitions can be interpreted as characterizations of the context of the text in which the term appears. For example, if a user consistently confirms term definitions that are characteristic of technical subject matter, then subsequent rankings of definitions (e.g., at 1120 in process 1100 (FIG. 11)) can rank technical definitions above other definitions.

FIG. 16 is a schematic representation of another example implementation of electronic device 100 that is sensitive to the context of text in providing one or more definitions of a term. In the illustrated implementation, dictionary data 1610 that is suited for the provision of context-sensitive definitions of terms and a definition finder application 1640 are stored and performed remotely from electronic device 100 at a server system 1600. The content of dictionary data 1610 is stored in one or more persistent data storage devices that are accessible by definition finder application 1640. Dictionary data 1610 can be stored in collections such as, e.g., collections 700, 800, 900, 1000.

Definition finder application 1640 is a software component that configures one or more data processing devices at server system 1600 to locate context-sensitive definitions for terms in a dictionary data store 1610. The terms that are to be defined, and the context of those terms, can be identified in one or more messages received from a remote electronic device 100 over a data communications network (e.g., over the Internet). Definition finder application 1640 can access the dictionary data 1610 to provide one or more definitions for terms in the textual media file content 520 that is being viewed at a remote device 100, e.g., using process 1100.

In operation, a remote electronic device 100 can interact with a user to receive a user selection of a term found in a text displayed at the electronic device 100. One or more messages identifying the selected term and characterizing the text from which the term was selected can be transmitted from the electronic device 100 to server system 1600. The text can be characterized in the one or more messages in a variety of ways. For example, in some implementations, the text is identified by name or other identifier and characteristics of the context of the text are determined by server system 1600. In other implementations, characteristics of the context of the text characterize the text in the one or more messages.

Server system 1600 receives the user selection of the term and the characterization of the text. In response, server system 1600 compares the characteristics of the context of the text with the characteristics of different definitions of the selected term and ranks different definitions of the selected term based at least in part on the result of the comparison according to likelihood that the definitions appropriately characterize the usage of the term within the text. Server system 1600 then transmits one or more messages to remote electronic device 100 that characterize the ranking of the different definitions. In some implementations, server system 1600 also transmits one or more of the different definitions to remote electronic device 100. Remote electronic device can display one or more of the different definitions according to the rankings provided by server system 1600.

In some implementations, a software component that configures one or more data processing devices to locate context-sensitive term definitions in dictionary data store 1610 is also located remotely from electronic device 100 and accessible over a data communications network (e.g., over the Internet). Such a remote software component can use a variety of different approaches to locate definitions depending, e.g., on the structuring of dictionary data store 130 and the context being matched, including those described above.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD- ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Electronic devices, including electronic device 100, may have duplicate components, including one or more display screens.

What is claimed is:

1. A system comprising:
    an electronic device comprising
        one or more persistent data storage devices storing
            multiple definitions of a first term, each of the definitions stored in association with a characterization of a context of texts in which the definition appropriately characterizes usage of the first term, wherein at least some of the definitions are stored in association with characterizations of time periods, and
            one or more media files that includes textual content, the textual content including the first term;
        one or more display screens configured to display the textual content of a first of the media files;
        one or more input elements configured to receive a user selection of the first term within a particular textual content; and
        one or more data processing devices programmed to respond to receipt of the user selection of the first term by performing operations comprising
            accessing, from the one or more persistent data storage devices, the characterizations of the contexts of the texts that are stored in association with the definitions of the first term,
            comparing the accessed characterizations of the contexts of the texts with one or more characteristics of the context of the particular textual content, and
            ranking the definitions of the first term according to respective likelihoods that the definitions appropriately characterize the usage of the first term within the particular textual content,
            wherein the one or more data processing devices is programmed to compare the time periods with a date when the particular textual content was authored.

2. The system of claim 1, wherein the multiple definitions of the first term are stored in different dictionaries, each of the dictionaries including definitions that appropriately characterize term usage in different contexts of texts.

3. The system of claim 1, wherein:
    the first of the media files further comprises metadata characterizing the particular textual content; and
    the one or more data processing devices is programmed to access the metadata to determine the one or more characteristics of the context of the particular textual content.

4. The system of claim 1, wherein the operations further comprise determining the one or more characteristics of the context of the particular textual content from indications found within the particular textual content.

5. The system of claim 1, wherein:
    the operations further comprise determining a context of the first term within the particular textual content; and
    the ranking of the definitions is based on both
        the determined context of the first term within the particular textual content and
        results of the comparison of the characterizations of the contexts of the texts and the one or more characteristics of the context of the particular textual content.

6. The system of claim 5, wherein the system comprises a syntactic analyzer that determines the syntactic context of the first term within the particular textual content.

7. The system of claim 1, wherein
    the one or more data processing devices is programmed to analyze the particular textual content to determine the characterizations of the contexts of the particular textual content.

8. The system of claim 1, wherein:
    at least some of the definitions are stored in association with characterizations of subject matter; and
    the one or more data processing devices is programmed to compare the subject matter with a subject matter of the particular textual content.

9. The system of claim 1, wherein:
at least some of the definitions are stored in association with characterizations of geographic contexts; and
the one or more data processing devices is programmed to compare the geographic context associated with the definitions with a geographic context of the particular textual content.

10. A method performed by a system of one or more data processing devices, the method comprising:
receiving, by the system, user selection of a term found in a text displayed by the system;
determining, by the system, one or more of a historical context of the text, a geographical context of the text, or a subject matter context of the text;
comparing, by the system, the one or more of the historical, the geographic, or the subject matter contexts of the text to one or more characteristics of different definitions of the selected term;
ranking, by the system, the different definitions of the selected term based at least in part on a result of the comparison; and
displaying, by the system, one or more of the different definitions according to the ranking of the different definitions;
receiving, by the system, a user confirmation of the propriety or impropriety of a displayed definition;
receiving user selection of a second term found in the text; and
ranking, by the system, different definitions of the second term based at least in part on the user confirmation of the propriety or impropriety of the definition of the first term; and
displaying, by the system, one or more of the different definitions of the second term according to the ranking of the different definitions of the second term,
wherein the first term differs from the second term.

11. The method of claim 10, wherein the system comprises a server system that performs the comparing and the ranking and a remote electronic device that performs the displaying.

12. The method of claim 10, further comprising transmitting a message characterizing the user confirmation of the propriety or impropriety of the displayed definition to a remote dictionary data system.

13. The method of claim 10, wherein determining the one or more of the historical, the geographic, or the subject matter contexts of the text comprises searching the text for textual indications of the one or more of the historical, the geographic, or the subject matter contexts of the text.

14. The method of claim 13, wherein determining the one or more of the historical, the geographic, or the subject matter contexts of the text further comprises:
accessing metadata in a media file that is associated with the text; and
comparing the metadata with the textual indications.

15. A system of electronic devices, the system comprising:
a plurality of electronic devices each comprising;
one or more persistent data storage devices storing multiple definitions of a first term, each of the definitions stored in association with a characterization of a context of texts in which the definition appropriately characterizes usage of the first term, wherein at least some of the definitions are stored in association with characterizations of time periods, and
a media file that includes textual content, the textual content including the first term;
one or more display screens configured to display the textual content of the media file;
one or more input elements configured to receive a user selection of the first term within the textual content; and
one or more data processors programmed to receive user confirmations of the propriety or impropriety of different definitions for characterizing usage of a first term in a particular text, the one or more data processing devices programmed to respond to receipt of the user selection of the first term by performing operations comprising
accessing, from the one or more persistent data storage devices, the characterizations of the contexts of the texts,
comparing the accessed characterizations of the contexts of the texts with one or more characteristics of the context of the textual content of the media file, the comparing including comparing the time periods with a date when the textual content was authored, and
ranking the definitions of the first term according to respective likelihoods that the definitions appropriately characterize the usage of the first term within the textual content of the media file; and
a communication interface configured to output messages characterizing the user confirmations and the particular text.

16. The system of claim 15, further comprising:
a dictionary data system comprising
a communication interface configured to receive the messages output by the electronic devices in the plurality of electronics devices and
one or more persistent data storage devices storing characterizations of the user confirmations received from the electronic devices in the plurality of electronic devices.

17. A method implemented by a system of one or more data processing devices, the method comprising:
receiving, at the system from a plurality of remote electronic devices, a plurality of messages characterizing user confirmations of the propriety or impropriety of different definitions for characterizing usages of a first term in different texts;
storing information characterizing the definitions and the texts in one or more persistent data storage devices;
analyzing, by the system, the information stored at the one or more persistent data storage devices to determine a plurality of weights that represent likelihoods that the different definitions appropriately characterize usages of the first term in a plurality of different time periods; and
outputting the plurality of weights and identifiers of the time periods in which the weights represent the likelihoods from the system.

18. The method of claim 17, wherein outputting the weights comprises distributing the weights to at least some of the remote electronic devices.

19. The method of claim 17, further comprising:
comparing, by at least some of the plurality of remote electronic devices, a date in which a particular text was authored with the identifiers of the time periods to identify ones of the plurality of weights; and
ranking, by the at least some of the plurality of remote electronic devices, the definitions of the first term according to the ones of the plurality of weights.

20. A system comprising:

an electronic device comprising one or more persistent data storage devices storing multiple definitions of a first term, each of the definitions stored in association with a characterization of a context of texts in which the definition appropriately characterizes usage of the first term, wherein at least some of the definitions are stored in association with characterizations of time periods, and one or more media files that includes textual content, the textual content including the first term;

one or more display screens configured to display the textual content of a first of the media files;

one or more input elements configured to receive a user selection of the first term within a particular textual content; and one or more data processing devices programmed to respond to receipt of the user selection of the first term by performing operations comprising accessing, from the one or more persistent data storage devices, the characterizations of the contexts of the texts that are stored in association with the definitions of the first term, comparing the accessed characterizations of the contexts of the texts with one or more characteristics of the context of the particular textual content, and ranking the definitions of the first term according to respective likelihoods that the definitions appropriately characterize the usage of the first term within the particular textual content, wherein the one or more data processing devices is programmed to analyze the particular textual content to determine the characteristics of the context of the particular textual content.

* * * * *

UNITED STATES PATENT AND TRADEMARK OFFICE
CERTIFICATE OF CORRECTION

| | |
|---|---|
| PATENT NO. | : 8,521,517 B2 |
| APPLICATION NO. | : 13/249410 |
| DATED | : August 27, 2013 |
| INVENTOR(S) | : Thomas G. O'Neill |

Page 1 of 1

It is certified that error appears in the above-identified patent and that said Letters Patent is hereby corrected as shown below:

In the Claims

Column 19, line 57, in Claim 15, delete "comprising;" and insert --comprising:-- therefor.

Column 20, line 34, in Claim 16, delete "electronics" and insert --electronic-- therefor.

Signed and Sealed this
Twentieth Day of May, 2014

Michelle K. Lee
*Deputy Director of the United States Patent and Trademark Office*